US 9,721,097 B1

United States Patent
Davis et al.

(10) Patent No.: US 9,721,097 B1
(45) Date of Patent: Aug. 1, 2017

(54) NEURAL ATTENTION MECHANISMS FOR MALWARE ANALYSIS

(71) Applicant: Cylance Inc., Irvine, CA (US)

(72) Inventors: Andrew Davis, Portland, OR (US); Matthew Wolff, Laguna Niguel, CA (US); Michael Wojnowicz, Irvine, CA (US); Derek A. Soeder, Irvine, CA (US); Xuan Zhao, Irvine, CA (US)

(73) Assignee: Cylance Inc., Irvine, CA (US)

( * ) Notice: Subject to any disclaimer, the term of this patent is extended or adjusted under 35 U.S.C. 154(b) by 0 days.

(21) Appl. No.: 15/216,661

(22) Filed: Jul. 21, 2016

(51) Int. Cl.
| | |
|---|---|
| *G06F 21/00* | (2013.01) |
| *G06F 21/56* | (2013.01) |
| *G06N 3/04* | (2006.01) |
| *G06N 3/08* | (2006.01) |
| *G06N 7/00* | (2006.01) |

(52) U.S. Cl.
CPC ......... *G06F 21/562* (2013.01); *G06N 3/0445* (2013.01); *G06N 3/0454* (2013.01); *G06N 3/08* (2013.01); *G06N 7/005* (2013.01); *G06F 2221/033* (2013.01)

(58) Field of Classification Search
CPC . H04L 63/1416; H04L 63/1425; G06N 7/005; G06N 3/0445; G06N 3/08; G06N 3/0454; G06F 21/562; G06F 2221/033
See application file for complete search history.

(56) References Cited

U.S. PATENT DOCUMENTS

| | | | |
|---|---|---|---|
| 2014/0279779 A1* | 9/2014 | Zou .......................... | G06N 3/08 706/25 |
| 2015/0254555 A1* | 9/2015 | Williams, Jr. ....... | G06N 3/0454 706/14 |

* cited by examiner

*Primary Examiner* — Kendall Dolly
(74) *Attorney, Agent, or Firm* — Jones Day

(57) ABSTRACT

As part of an analysis of the likelihood that a given input (e.g. a file, etc.) includes malicious code, a convolutional neural network can be used to review a sequence of chunks into which an input is divided to assess how best to navigate through the input and to classify parts of the input in a most optimal manner. At least some of the sequence of chunks can be further examined using a recurrent neural network in series with the convolutional neural network to determine how to progress through the sequence of chunks. A state of the at least some of the chunks examined using the recurrent neural network summarized to form an output indicative of the likelihood that the input includes malicious code. Methods, systems, and articles of manufacture are also described.

15 Claims, 4 Drawing Sheets

NEURAL ATTENTION MECHANISMS FOR MALWARE ANALYSIS

TECHNICAL FIELD

The subject matter described herein relates to analysis of computer software, and in some examples, to analysis of computer files for discernment of the presence of malware or other undesirable code, executable files, or the like.

BACKGROUND

In many implementations of machine learning, significant effort may be expended on manually designing features for the purposes of simplifying the learning problem for the classifier. In the case that the inputs are variable-length, feature engineering is generally required to convert the variable-length representation of the raw data into a fixed-length representation that a classifier (e.g., decision trees, logistic regression models, neural networks, etc.) can then use to make decisions about inputs. In this case, the usefulness of the classifier may be almost entirely dependent on the ability of the domain experts to reduce an input of perhaps arbitrary length to a set of fixed descriptive features in a way that maintains predictive power without consuming an inordinate amount of computing resources and/or requiring so long to operate that potential threats cannot be discerned on a usable timescale.

SUMMARY

In one aspect, a method includes reviewing a sequence of chunks into which an input is divided using a convolutional neural network. The reviewing includes assessing how best to navigate through the input and to classify parts of the input in a most optimal manner. The method further includes examining at least some of the sequence of chunks using a recurrent neural network in series with the convolutional neural network to determine how to progress through the sequence of chunks, and summarizing a state of the at least some of the chunks examined using the recurrent neural network to form an output indicative of a likelihood that the input includes malicious code.

In some variations one or more of the following features can optionally be included in any feasible combination. The summarizing of the state of the examined at least some of the sequence of chunks can include concatenating a state of individual chunks of the at least some of the sequence of chunks examined using the recurrent neural network. The examining can include the recurrent neural network deciding, based on a review of a given chunk of the sequence of chunks, whether to examine a next chunk in the sequence of chunks, to skip the next chunk, or to skip the next chunk and one or more additional chunks in the sequence of chunks before reviewing another chunk in the sequence of chunks. The convolutional neural network can transform input bytes of the input into the sequence of chunks, which can include a sequence of convolutional features. The recurrent neural network can converts the sequence of convolutional features into temporal features. The method can further include calculating a difference between the output and a desired target output and interpreting the difference as indicative of a ground-truth of the maliciousness of the input. The method can also further include backpropagating the difference back through a plurality of hidden states to update model parameters in a way that better classifies the input.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to machine learning models for discernment of potential threats in code or other computer files, it should be readily understood that such features are not necessarily intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DESCRIPTION

Malware analysis approaches typically involve analysis of features of a file relevant to the question of whether a file of arbitrary length matches a particular attribute. For example, a feature may indicate what compiler was used to compile the file, and another feature may indicate the size of the file. Other features may indicate the presence of a string in a file, and other features may measure the entropy of particular sections of the executable. While the majority of these features cannot singularly discriminate between "good" and "bad" files, the feature values taken together can provide a reliable classification of good versus bad. The term "file" as used herein broadly includes files that can be classified as "executable" files, or simply as "executables." An executable is a file that includes one or more instructions or other routines that can be executed by one or more programmable processors of one of more computing systems. Generally speaking, an executable can be any file that may include malicious code, including but not limited to data files, programs, sub-routines, scripts, functions, etc. An executable may present itself as something other than an executable file. Alternatively or in addition, an executable may be embedded in some other file, for example either within another executable file or in a data file or some other file that does not appear to include executable code. Approaches as described herein can be used for discernment of threats from potential executables when a file is read by a processor (e.g. from a computer-accessible storage device, a networked storage, another machine, etc.), is downloaded to a computing system or cluster of computing systems, accessed by a background or active scan of files retained on one or more storage devices, initiates (or has initiated for it) an execution of one or more programmed actions, attempts to write to a data storage or to system memory of a computing system, or the like.

While feature engineering decisions of security experts can yield highly discriminative classifiers, some novel samples may still evade detection. Looking beyond human-engineered features by using more advanced machine learning methods trained on a very large corpus of malware can enable realization of greater predictive power, for example by incorporating one or more features described herein. In some examples, machine learning approaches similar to those illustrated in FIG. 1 and described below can be used as part of a machine learning model discernment approach for evaluating input files, which may or may not be executables.

Figure 1:
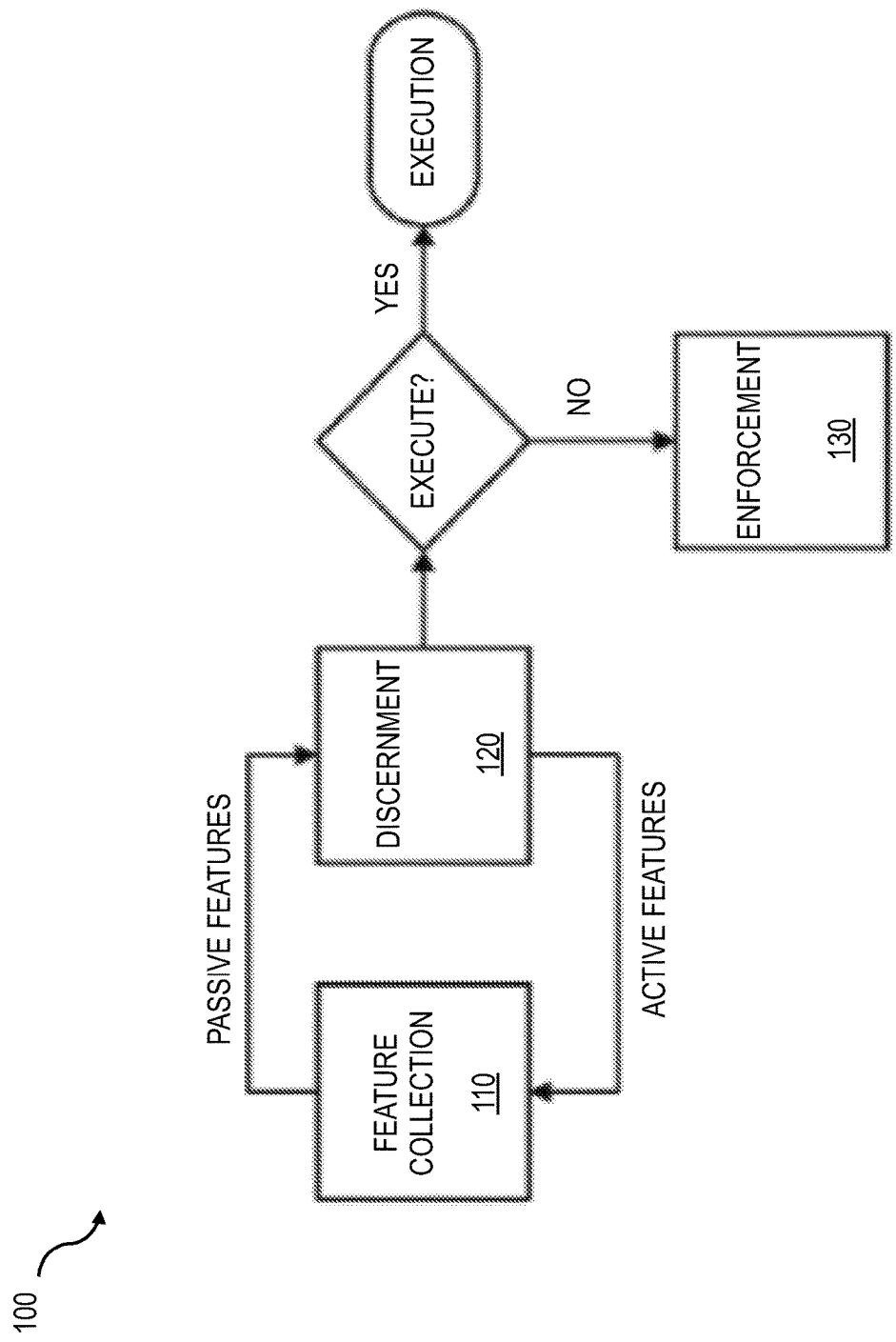
FIG. 1 shows a diagram illustrating features of a machine learning approach for threat discernment in computing environments.

FIG. 1 shows a diagram illustrating an example of software elements that can be included in a machine learning model 100 for use in a discernment application. A feature collection module 110 (sometimes referred to as a feature collector), a discernment module 120, and an enforcement module 130 can interact to learn from one or more samples and to provide predictive outputs regarding the likelihood of a given file being a threat. As used herein, the term "module" refers to software functionality that can be implemented via one or more programmable processors that are part of one or more computing systems. The feature collection module 110 collects or otherwise accesses features characterizing a file and/or the environment in which the file is being, read, downloaded, executed, written to, etc. A feature refers to any salient data point that can be measured from a sample. As used herein, a sample refers to any piece of data upon which classifying or similarity analysis operations against similar samples can be performed. A multiclass classifier refers to a classifier that can support classification in three or more classes. A multi-model classifier refers to a classifier that uses sub models to handle particular intricacies in a complex sample. A generative classifier refers to a classifier in which samples used to classify may become training material for future analysis.

A model can be a single or multi-model probability matrix that defines the likelihood of any sample to be classified in a particular class. Consistent with the current subject matter, machine learning models can implemented as both cloud-based instances and locally running instances (e.g. at one or more endpoint computers of an organization).

Features collected and/or accessed by the feature collection module 110 are passed on to the discernment module 120, which can make a decision on whether or not to allow the file to execute (or a file to be downloaded, opened, etc.). If it is determined that the file should not execute or some other action with the file should be prevented, the enforcement module 130 can take action to prevent the file from executing, opening, continuing to execute, writing, being downloaded, etc. In some implementations of the current subject matter, the enforcement module 130 can require quarantining of a file or the like that is assessed as a potential threat.

A machine learning threat discernment model or an ensemble of machine learning threat discernment models can be devised and trained before application control. Due to the predictive nature of various machine learning algorithms, a trained model allows a "fuzzy" match against safe and unsafe programs. As used herein, the terms "safe" and "unsafe" generally refer to a machine-generated, relative classification based on an estimate of the danger presented by one or more files that could be a threat. A machine learning threat discernment model as described herein can output a threat score for a given file, and the threat score can be used to classify the file as safe or unsafe. Other classification protocols with more that two divisions are also within the scope of the current subject matter. In non-limiting examples, threat score outputs from one or more machine learning threat discernment models can be used to classify potential threats in three categories (e.g. safe, suspect, unsafe or similar labels), four categories (e.g. safe, suspect but likely safe, suspect but likely unsafe, and unsafe or similar labels), or more than four categories.

By carefully selecting and training the machine learning threat discernment models in an ensemble of such models, a threat discernment system can act resiliently against change over time, accommodating small and large changes in program behaviors that resemble "safety" or a lack thereof. Machine learning threat discernment models may be characterized by one or more algorithms incorporated therein, which may include, as illustrative examples, neural networks, support vector machines, logistic regression models, Bayesian algorithms, and decision trees. A machine learning threat discernment model can be trained using supervised learning, in which a training set of input samples labeled with the desired output values conditions the model to correctly classify samples that do not occur in the training set, or it may be trained using unsupervised learning, in which an algorithm identifies hidden structure in unlabeled data. Reinforcement learning represents a third process for training a machine learning threat discernment model, where virtual agents interacting with an environment are encouraged to learn to accomplish some goal through a feedback mechanism, where good actions are rewarded and bad actions are penalized.

As noted above, machine learning threat discernment models such as those described herein can, in some examples, provide a risk or threat score as an output based on analysis of a given file. This score, and/or a classification based on such a score can be used to determine whether the file should be allowed to proceed without restriction or is instead flagged as a potential threat. For example, referring back again to the diagram 100 of FIG. 1, a feature collector module 110 can send passive features (operational and dynamic) on an ongoing basis to a discernment module 120. The discernment module 120 can request point in time features from the feature collector module 110 at a particular decision point, such as execution of a file (e.g. a program). These point-in-time features can include observations about the computer's state extrinsic to the file or related features from an external source. The discernment module 120 can then decide if a file should execute or if other actions (e.g. opening or downloading a file, transmitting or receiving data, etc.) are allowed to begin or proceed. If execution/opening/downloading is allowed based on the decision of the discernment module about a file, a program executes or a file is opened or downloaded, or other actions related to the file can occur. If an action is disallowed, an enforcement module 130 can prevent it from occurring.

Machine learning approaches can be applied both locally (e.g. at one or more computer endpoints) and via a networked (e.g. cloud-based) service in which suspect files or programs are analyzed by models implemented on one or more servers or other computers. In some implementations, both a local version (e.g. executing on an endpoint machine) of a model and a cloud-based version of the model may handle discernment tasks. The local model can provide endpoint detection that does not rely on the presence of a network connection and that does not require transmission of information about a suspected threat to servers running the cloud-based version of the model. The cloud-based version can be more readily updated with improvements in the machine learning and other features that may lead to better discernment of threats. Additionally, a cloud-based model can learn from inputs received from multiple endpoints and may therefore be better at adapting to new types of threats. As such, a given suspected threat may be analyzed by both a cloud-based version of a machine learning model and a local version of the machine learning model. Because the cloud-based model generally has access to more updated information as well as a greater pool of training inputs, in cases where a cloud-based model and a locally running model disagree, the typical approach is to let the scoring of a file, program, activity, etc. produced by the cloud-based model govern the final score given to the file, program, activity, etc. (which are generically referred to herein as "samples").

Approaches such as convolutional neural networks can yield classifiers that can learn to extract features that are at least as effective as human-engineered features. While such models are currently applied to image and audio data, recent results demonstrate that these approaches may provide previously unappreciated effectiveness with other data types, such as text data. While applying such approaches to the bytes of an executable for the purposes of malware classification can result in some improvement, a limiting factor to the effectiveness of such a model can be the ability to process longer samples. While image data tends to be of a small and fixed size (e.g., 256×256 pixels and 3 color channels), executables exist in a large range of potential file sizes, from several kilobytes to hundreds of megabytes.

In a naive configuration of a machine learning model discernment approach incorporating convolution neural network, the convolutional neural network would generally apply uniform amounts of computation to all regions of an input sample. In executable files, however, there may be large sections of benign code that would not help a classifier to determine whether the file is malicious. For example, a typical currently available approach might include some initial feature engineering, which can include definition of one or more n-grams (e.g. byte sequences). Based on this initial feature engineering, one or more classifiers may be developed to assist a machine learning algorithm.

Implementations of the current subject matter can improve upon currently available approaches by enabling processing of large data sets (e.g. files of widely varying sizes containing code fragments) while requiring minimal engineering of feature set inputs to allow a machine learning model to adapt and learn how to parse inputs. The approaches described herein, as well as other comparable variants thereof, provide the ability to build models that can work well across a broad variety of input file sizes. A model consistent with implementations of the current subject matter can advantageously possess a sense of attention, and can therefore be able to steer itself through an input (e.g. an input file, a part of an input file, a code fragment, etc.) in order to focus on the parts of the file that have the highest importance for classification. In other words, the model can intelligently, and without significant guidance from human users, decide which parts of the input should be considered to be important and can therefore focus its attention only on the "important" parts (e.g. the important subset of the code text, etc.).

Figure 2:
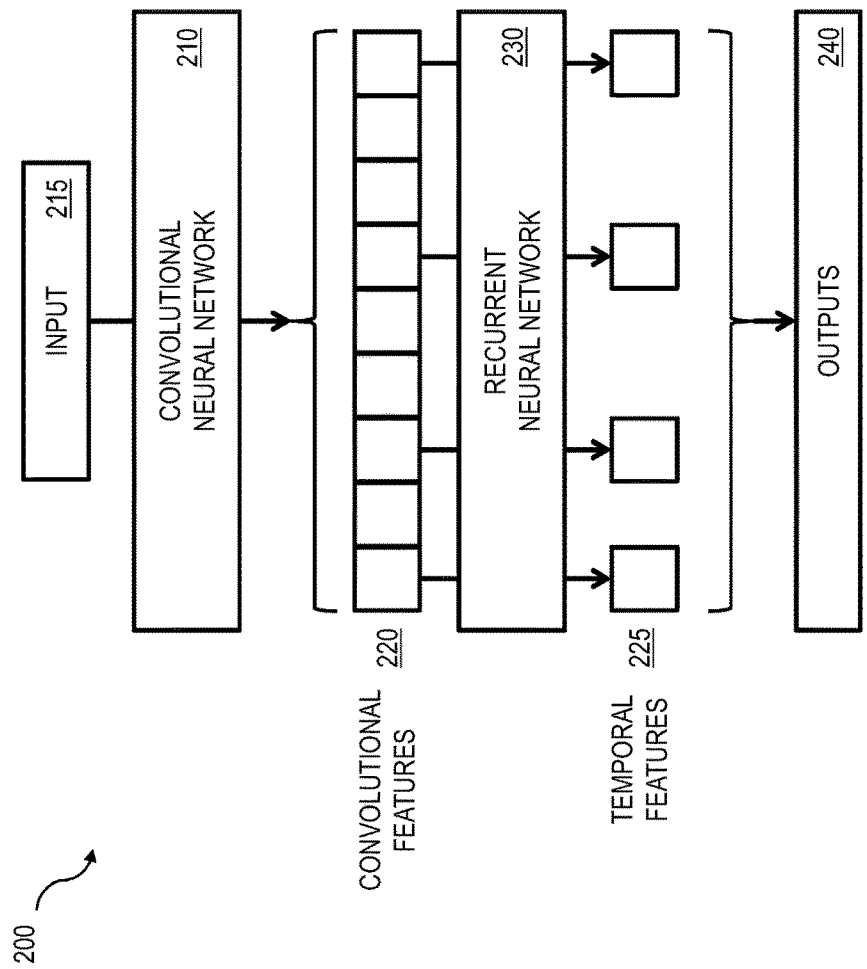
FIG. 2 shows a diagram illustrating operation of an attention mechanism consistent with implementations of the current subject matter.

As illustrated in FIG. 2, a machine learning model consistent with implementations of the current subject matter can advantageously make use of an attention mechanism 200, which includes three parts connected in series: a convolutional neural network 210, a recurrent neural network 230, and outputs 240. The convolutional neural network 210 transforms input bytes of an input sample 215 into more useful representations, for example a sequence of convolutional features 220. The recurrent neural network 230 converts the sequence of convolutional features 220 into temporal features 225. The outputs 250 classify the input sample 215 based on a concatenation of states for the temporal features 225 into which the recurrent neural network 230 converted the convolutional features 220. The outputs 240 further indicate to the attention mechanism 100 where to attend next (e.g. which of the convolutional features should be considered next based on a temporal state determined by the recurrent neural network 230.

A convolutional neural network is a special case of a fully connected neural network where the connectivity structure between nodes in the graph is localized. For example, a convolutional neural network applied to image data may have connectivity such that pixels close together are connected, but pixels that are far apart have no connection. Similarly, convolutional neural networks may be applied in natural language processing, with connectivity structures relating words close together, and no connectivity between words that are far apart. Because the semantic meaning of code (and potentially data) is similarly localized in that operands of instructions follow instructions, and the instructions that make up functions tend to be located close to each other, convolutional neural networks can be an appropriate model for dealing with executable data.

A recurrent neural network is a type of neural network that has recurrent connectivity. In other words, the model retains an internal state encoded as a vector of numbers, which is then used in the function to compute the next state of the model. Such a recurrent structure gives the model an explicit sense of memory, allowing the model to more directly deal with temporal data. Because the attention model approach described herein deals with successive timesteps as it traverses a file, recurrent neural networks can be useful in summarizing the information the attention model has seen so far.

Consistent with various implementations of the current subject matter, the convolutional neural network can consist of many convolutional and max-pooling layers, while the recurrent neural network can consist of many recurrent layers. The output layers may consist of any number of fully connected layers.

Figure 3:
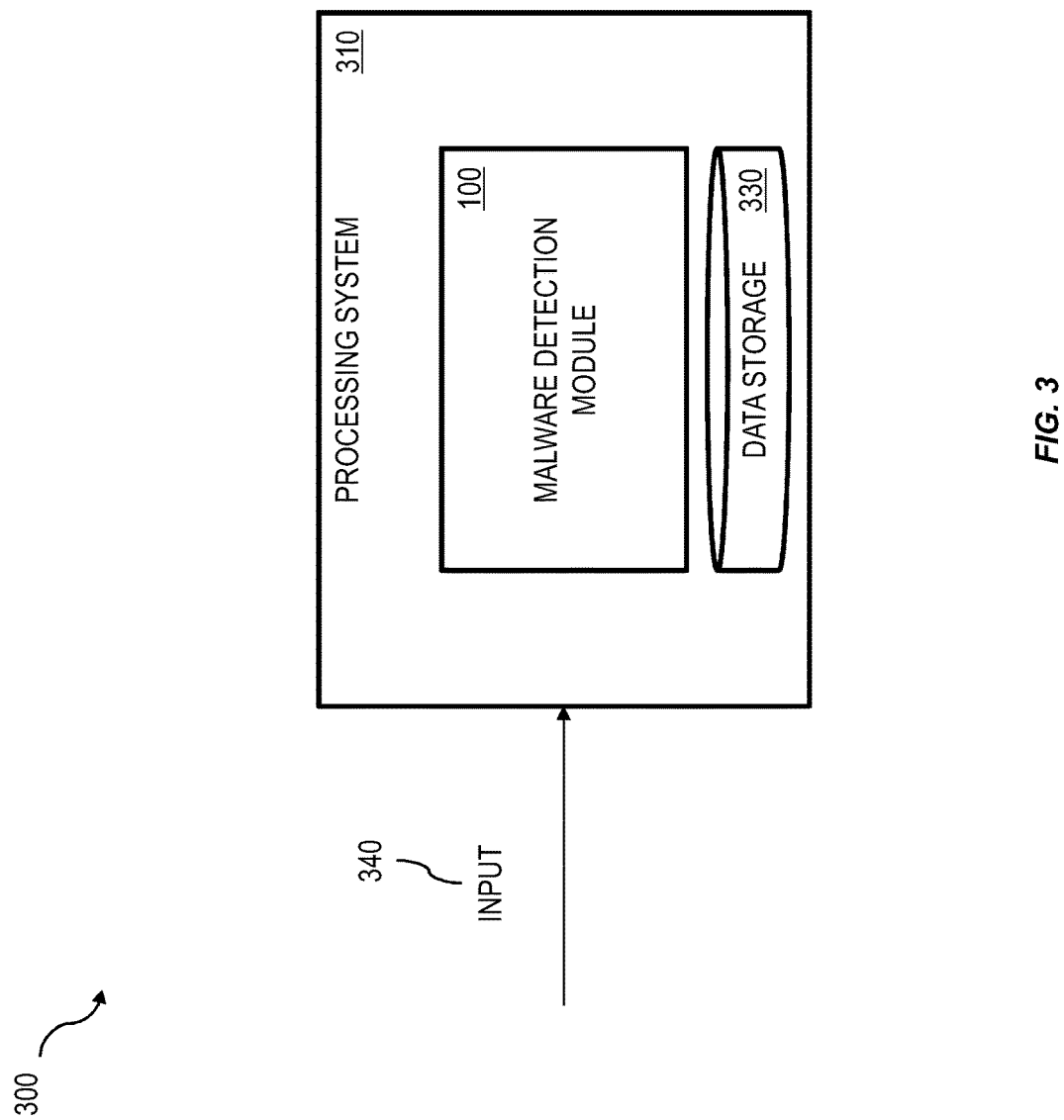
FIG. 3 shows a diagram illustrating aspects of a system showing features consistent with implementations of the current subject matter.

FIG. 3 shows a diagram illustrating features of a computing architecture 300 within which one or more features of the current subject matter can be implemented. The computing architecture 300 can include a processing system 310, which can include a malware detection module 100 and a data storage 330. The processing system can receive an input 340, which can be an executable (including but not limited to any of the examples discussed above). The input 340 can be received by the processing system 340 via a wired and/or wireless communications network, e.g., an Internet, an intranet, an extranet, a local area network ("LAN"), a wide area network ("WAN"), a metropolitan area network ("MAN"), a virtual local area network ("VLAN"), and/or any other network. Alternatively, the input can be present on the data storage 330 and loaded therefrom into RAM or other main system memory for execution. The data storage 330 can be internal to the processing system or external or removable. For example, the data storage 330 can be used for storage of data processed by the processing system 310 and can include any type of memory, e.g., a temporary memory, a permanent memory, and/or any other type of memory and/or any combination thereof.

The processing system 310 can be implemented using software, hardware and/or any combination of both. The processing system 310 can be implemented in a personal computer, a laptop, a server, a mobile telephone, a smartphone, a tablet, and/or any other type of device and/or any combination of devices. The malware detection module 320 can perform one or more operations described herein on the input 340 as well as machine learning functions, as discussed in further detail above. While the output classification may be directly supervised, the attention mechanism must learn how to best move its attention about the file in a relatively unsupervised manner. Reinforcement learning can be used in such cases. For example, the attention model can receive a positive reward when it makes a series of attention decisions that allows the model to make a correct classification or a negative reward when it makes a series of decisions that results in an incorrect classification.

Overall, the entire neural network (the convolutional net, recurrent net, and output net) generally seeks to optimize two functions, which include a cross-entropy loss, $L_c$, typically used for classification (as calculated in Eq. 1, below), and a loss, $L_q$, corresponding to the Q-learning reinforcement learning algorithm (as calculated in Eq. 2 below).

$$L_c(\theta,x) = -(y \log(C(\theta,x)) + (1-y)(1-C(\theta,x))) \quad (1)$$

$$L_q(f,x) = \|Q_{t+1}(\theta,s_t+a_t) - (R_{t+1} + \gamma \max Q_t(s_{t+1},a))\| \quad (2)$$

The classification output of the model, $C(\theta,x)$, is an estimate of a probability distribution function that outputs a likelihood of maliciousness in (0, 1), where an output close to 0 indicates the sample is likely benign and 1 indicates the sample is likely malicious.

The action output of the model, $Q_t+1\ (\theta,s_t,a_t)$, is a function that attempts to assess the value of a pair of states, $s_t$, and actions $a_t$, for a particular timestep t. The state S is derived from the recurrent neural network, and the action space A may be a set of discrete actions, i.e., [128, 256, 384, 512, 768], where 128 indicates an advancement to the next 128 bytes, 256 indicates an advancement to the next 256 bytes, and so forth.

Given Eq. 1 and Eq. 2, the attention model can optimize its parameters in order to accomplish two goals—first, to better classify samples it has never before seen, and second, to better learn how to traverse the file in order to extract evidence to classify a file as benign or malicious. Eq. 1 involves calculating a difference between the attention model's output and a desired target output, which indicates the ground-truth of the maliciousness of the input sample. The model can then backpropagate this error back through the hidden states of the model in order to update the parameters in a way that better classifies the sample. Eq. 2, on the other hand, works with less direct supervision. At the end of the attention sequence, a reward r is dispensed over all timesteps for the reward $R_t$. If the reward is positive (i.e., if the model correctly classifies the sample), the equation will assign a higher chance of choosing the sequence of actions it took in similar situations. If the reward is negative, the equation will discourage the agent from taking similar actions in later trials. This allows for credit assignment to propagate through the actions the agent takes, resulting in a model that can learn how to traverse a binary file.

In practice, implementations of the current subject matter can include the following operations. Rather than relying on n-grams or other predefined means of identifying chunks of code to review, a classifier consistent with the subject matter described herein can make use of a convolutional neural network to review small chunks of an input 240 (e.g. an input file containing text that include executable code). The small chunks can, in one example, be 1 kb in size, although other sizes are also within the scope of the current subject matter. The convolutional neural network assesses, based on review of these chunks, how best to navigate through the input and to classify parts of the input in the most optimal manner. The recurrent neural network also examines each chunk and propagates results to control an output. For example, based on a given chunk, the recurrent neural network can decide to examine a next chunk, skip a next chunk, skip some number (greater than one) of chunks, or perform other actions. At an end of a sequence of chunks into which the input is divided, a state of each chunk that was examined can be summarized by concatenating these states, for example into a vector of numbers that indicate or are otherwise related to an assessment of the "goodness" or "badness" of the input with regards to its potential to be malware or other malicious code.

Implementations of the current subject matter can include combining a classification model with a reinforcement-learning model. The reinforcement-learning agent may thereby learn how to best navigate through a sample so that the classification model can best assess the sample's maliciousness. The approach can be quite general and can be generally applied to a wide variety of files, such as for example Microsoft Windows™ portable executable files or "PEs" (available from Microsoft Corporation of Redmond, Wash.); Adobe™ portable document format files or "PDFs" (available from Adobe Systems Incorporated of San Jose, Calif.); Microsoft Office™ files such as .DOC, .XLS, .DOCX, .XLSX, or the like (also available from Microsoft Corporation); scripting languages; etc. As will be understood from the descriptions provided herein, the current approach can be implemented using minimal feature engineering and file preprocessing.

Figure 4:
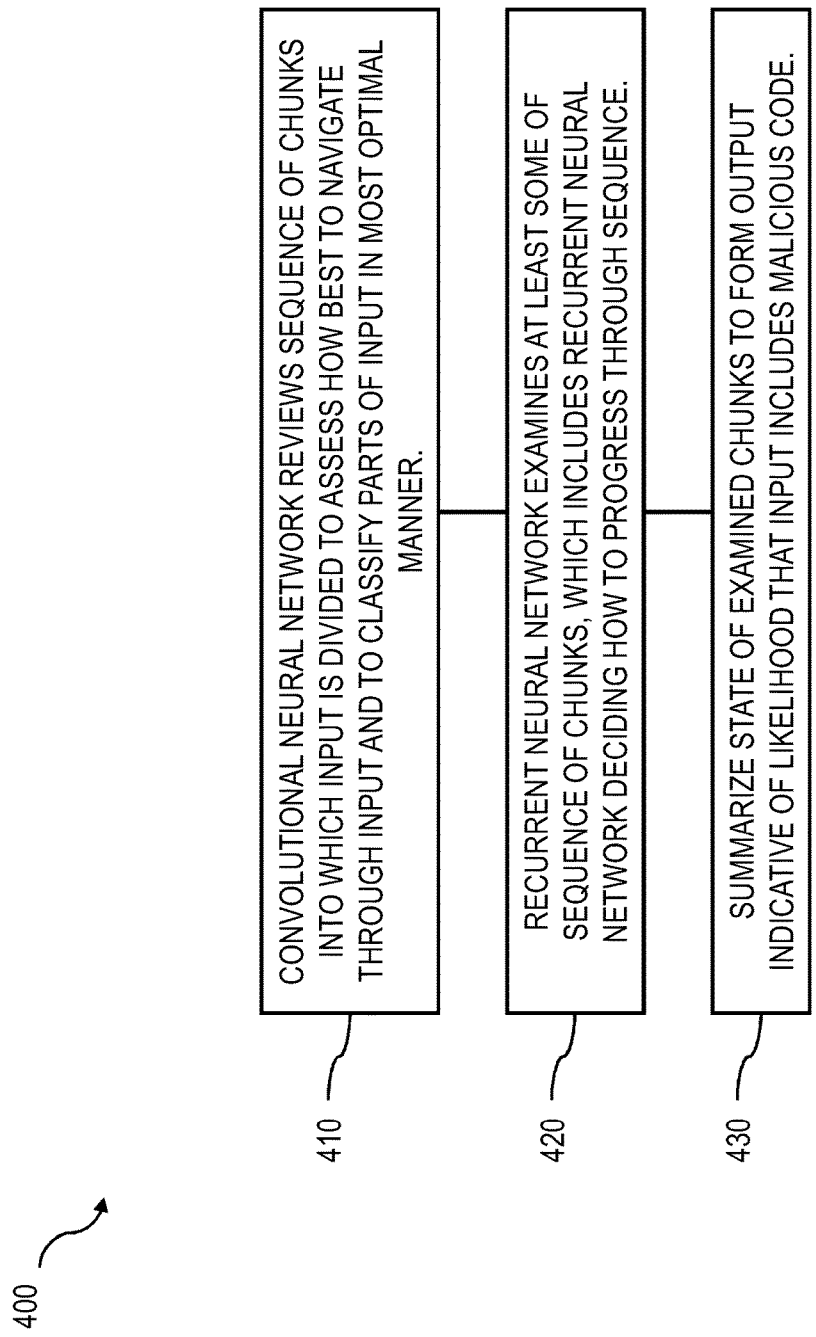
FIG. 4 shows a process flow diagram illustrating aspects of a method having one or more features consistent with implementations of the current subject matter.

FIG. 4 shows a process flow chart 400 illustrating features of a method consistent with implementations of the current subject matter. At 410, a convolutional neural network reviews small chunks into which an input is divided to assess how best to navigate through the input and to classify parts of the input in a most optimal manner. At 420, a recurrent neural network examines at least some of the chunks in the sequence of chunks as part of deciding how to progress through the sequence of chunks. The examining of the at least some of the chunks in the sequence of chunks can include the recurrent neural network deciding, based on review of a first chunk, whether to examine a next chunk or to skip one or more chunks before reviewing another chunk. At 430, a state of the examined chunks is summarized to form an output indicative of a likelihood that the input includes malicious code, for example by concatenating the states of individual chunks.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

Other implementations may be within the scope of the following claims.

What is claimed is:

1. A computer-implemented method for using machine learning to detect malicious code, the method comprising:
reviewing, with a convolutional neural network, a sequence of chunks into which an input is divided, the reviewing comprising optimizing a navigation through the input to at least classify the input;
examining, using a recurrent neural network in series with the convolutional neural network, at least some of the sequence of chunks to determine how to progress through the sequence of chunks;
summarizing a state of the at least some of the chunks examined using the recurrent neural network to form an output, the output comprising a classification of the input, the classification being indicative of a likelihood that the input includes malicious code;

calculating a difference between the output and a desired target output, the difference being interpreted as an error in the classification of the input; and backpropagating the difference back through a plurality of hidden states to update model parameters, the model parameters being updated to at least minimize the error in the classification of the input.

2. The computer-implemented method as in claim 1, wherein the summarizing of the state of the examined at least some of the sequence of chunks comprises concatenating a state of individual chunks of the at least some of the sequence of chunks examined using the recurrent neural network.

3. The computer-implemented method as in claim 1, wherein the examining comprises the recurrent neural network deciding, based on a review of a given chunk of the sequence of chunks, whether to examine a next chunk in the sequence of chunks, to skip the next chunk, or to skip the next chunk and one or more additional chunks in the sequence of chunks before reviewing another chunk in the sequence of chunks.

4. The computer-implemented method as in claim 1, wherein the convolutional neural network transforms input bytes of the input into the sequence of chunks which comprises a sequence of convolutional features.

5. The computer-implemented method as in claim 4, wherein the recurrent neural network converts the sequence of convolutional features into temporal features.

6. A computer program product comprising a non-transitory machine readable medium storing instructions that, when executed by at least one programmable processor, cause the at least one programmable processor to perform operations for using machine learning to detect malicious code, the operations comprising:

reviewing, with a convolutional neural network, a sequence of chunks into which an input is divided, the reviewing comprising optimizing a navigation through the input to at least classify the input;

examining, using a recurrent neural network in series with the convolutional neural network, at least some of the sequence of chunks to determine how to progress through the sequence of chunks;

summarizing a state of the at least some of the chunks examined using the recurrent neural network to form an output, the output comprising a classification of the input, the classification being indicative of a likelihood that the input includes malicious code;

calculating a difference between the output and a desired target output, the difference being interpreted as an error in the classification of the input; and backpropagating the difference back through a plurality of hidden states to update model parameters, the model parameters being updated to at least minimize the error in the classification of the input.

7. The computer program product as in claim 6, wherein the summarizing of the state of the examined at least some of the sequence of chunks comprises concatenating a state of individual chunks of the at least some of the sequence of chunks examined using the recurrent neural network.

8. The computer program product as in claim 6, wherein the examining comprises the recurrent neural network deciding, based on a review of a given chunk of the sequence of chunks, whether to examine a next chunk in the sequence of chunks, to skip the next chunk, or to skip the next chunk and one or more additional chunks in the sequence of chunks before reviewing another chunk in the sequence of chunks.

9. The computer program product as in claim 6, wherein the convolutional neural network transforms input bytes of the input into the sequence of chunks which comprises a sequence of convolutional features.

10. The computer program product as in claim 9, wherein the recurrent neural network converts the sequence of convolutional features into temporal features.

11. A system for using machine learning to detect malicious code, the system comprising computer hardware configured to perform operations comprising:

reviewing, with a convolutional neural network, a sequence of chunks into which an input is divided, the reviewing comprising optimizing a navigation through the input to at least classify the input;

examining, using a recurrent neural network in series with the convolutional neural network, at least some of the sequence of chunks to determine how to progress through the sequence of chunks;

summarizing a state of the at least some of the chunks examined using the recurrent neural network to form an output, the output comprising a classification of the input, the classification being indicative of a likelihood that the input includes malicious code;

calculating a difference between the output and a desired target output, the difference being interpreted as an error in the classification of the input; and backpropagating the difference back through a plurality of hidden states to update model parameters, the model parameters being updated to at least minimize the error in the classification of the input.

12. The system as in claim 11, wherein the summarizing of the state of the examined at least some of the sequence of chunks comprises concatenating a state of individual chunks of the at least some of the sequence of chunks examined using the recurrent neural network.

13. The system as in claim 11, wherein the examining comprises the recurrent neural network deciding, based on a review of a given chunk of the sequence of chunks, whether to examine a next chunk in the sequence of chunks, to skip the next chunk, or to skip the next chunk and one or more additional chunks in the sequence of chunks before reviewing another chunk in the sequence of chunks.

14. The system as in claim 11, wherein the convolutional neural network transforms input bytes of the input into the sequence of chunks which comprises a sequence of convolutional features.

15. The system as in claim 14, wherein the recurrent neural network converts the sequence of convolutional features into temporal features.

* * * * *